United States Patent
Gross

(10) Patent No.: US 9,901,994 B2
(45) Date of Patent: Feb. 27, 2018

(54) ROTATING TOOL AND TOOL HEAD

(71) Applicant: Kennametal Inc., Latrobe, PA (US)

(72) Inventor: Jochen Gross, Erlangen (DE)

(73) Assignee: KENNAMETAL INC., Latrobe, PA (US)

( * ) Notice: Subject to any disclaimer, the term of this patent is extended or adjusted under 35 U.S.C. 154(b) by 88 days.

(21) Appl. No.: 14/688,004

(22) Filed: Apr. 16, 2015

(65) Prior Publication Data
US 2015/0298224 A1 Oct. 22, 2015

(30) Foreign Application Priority Data
Apr. 17, 2014 (DE) .................. 10 2014 207 502

(51) Int. Cl.
*B23C 5/10* (2006.01)

(52) U.S. Cl.
CPC ............ *B23C 5/10* (2013.01); *B23C 2210/02* (2013.01); *B23C 2210/03* (2013.01); *B23C 2210/0492* (2013.01); *B23C 2226/125* (2013.01); *B23C 2226/315* (2013.01); *B23C 2240/08* (2013.01); *B23C 2240/32* (2013.01)

(58) Field of Classification Search
CPC ............ B23C 2210/02; B23C 2210/03; B23C 2240/32; B23C 5/10; B23C 2226/315; B23C 2226/25; B23C 2210/0492; B23C 2240/08; B23B 2251/02
See application file for complete search history.

(56) References Cited

U.S. PATENT DOCUMENTS

| | | | | |
|---|---|---|---|---|
| 53,496 A * | 3/1866 | Smith | ............................ | 407/31 |
| 1,887,372 A * | 11/1932 | Emmons | ................. | B23P 15/28 175/435 |
| RE19,182 E * | 5/1934 | Emmons | ................. | B23B 51/02 408/144 |
| 1,984,839 A * | 12/1934 | Murray | ..................... | G09F 3/00 116/200 |
| 2,282,596 A * | 5/1942 | Wise | ..................... | E21B 10/627 175/393 |
| 2,369,273 A * | 2/1945 | Bakewell | ............... | B23D 77/00 407/31 |
| 3,027,953 A * | 4/1962 | Coski | ..................... | B25D 17/02 172/745 |
| 4,679,971 A * | 7/1987 | Maier | ..................... | B23B 51/02 408/145 |
| 4,880,707 A * | 11/1989 | Kohno | ..................... | B22F 7/06 408/144 |

(Continued)

FOREIGN PATENT DOCUMENTS

| DE | 3620115 | 12/1987 |
|---|---|---|
| DE | 601 27 305 T2 | 12/2007 |

(Continued)

*Primary Examiner* — Sara Addisu
(74) *Attorney, Agent, or Firm* — Matthew S. Bedsole

(57) ABSTRACT

The invention relates to a rotating tool including a support shaft extending in the axial direction along a rotational axis and a tool head connected thereto having a base body extending along the rotational axis and a core, to which a jacket made of a cutting material is placed, wherein the core has a circular cross-section (Q) in the radial direction and a jacket has a specified wall thickness and wherein a number of grooves is made in the jacket in order to form a number of cutting edges.

15 Claims, 4 Drawing Sheets

(56) References Cited

U.S. PATENT DOCUMENTS

| | | | | |
|---|---|---|---|---|
| 5,031,484 A * | 7/1991 | Packer | B23C 5/006 | 407/118 |
| 5,114,286 A * | 5/1992 | Calkins | B23B 31/11 | 408/226 |
| 5,226,760 A * | 7/1993 | Nishimura | B22F 7/06 | 407/118 |
| 5,580,196 A | 12/1996 | Thompson | | |
| 6,146,476 A * | 11/2000 | Boyer | B23B 51/00 | 148/525 |
| 6,485,220 B2 * | 11/2002 | Hecht | B23B 31/11 | 403/343 |
| 6,511,265 B1 * | 1/2003 | Mirchandani | B22F 7/06 | 407/118 |
| 6,860,172 B2 * | 3/2005 | Hecht | B22F 3/02 | 408/204 |
| 7,104,160 B2 * | 9/2006 | Fries | B22F 7/06 | 76/108.1 |
| 7,147,939 B2 * | 12/2006 | Henderer | B23G 5/06 | 428/408 |
| 7,270,506 B2 * | 9/2007 | Guy | B23B 31/11 | 279/56 |
| 8,272,816 B2 * | 9/2012 | Mirchandani | B22F 7/062 | 407/118 |
| 8,821,082 B1 * | 9/2014 | Bolin | B23C 5/16 | 408/143 |
| 8,926,238 B1 * | 1/2015 | Bolin | B23C 5/00 | 408/143 |
| 8,931,983 B2 * | 1/2015 | Sharivker | B23B 31/11 | 408/143 |
| 9,339,918 B2 * | 5/2016 | Chang | B25B 13/06 | |
| 9,468,980 B2 * | 10/2016 | Cho | B23B 51/02 | |
| 9,586,270 B2 * | 3/2017 | Zielonka | B23B 51/0406 | |
| 2001/0024602 A1 | 9/2001 | Papajewski | | |
| 2002/0046885 A1 * | 4/2002 | Eichhorn | B23B 51/02 | 175/426 |
| 2003/0202853 A1 * | 10/2003 | Ko | B23B 51/02 | 408/225 |
| 2004/0013481 A1 * | 1/2004 | Jeppesen | B23B 51/0426 | 408/201 |
| 2007/0081872 A1 * | 4/2007 | Blomstedt | B23C 5/10 | 409/234 |
| 2007/0081873 A1 * | 4/2007 | Blomstedt | B23C 5/10 | 409/234 |
| 2008/0101878 A1 * | 5/2008 | Skilberg | B23B 31/11 | 407/54 |
| 2009/0142150 A1 * | 6/2009 | Chu | B23C 5/10 | 408/59 |
| 2010/0296881 A1 * | 11/2010 | Huang | B23C 5/10 | 407/47 |
| 2011/0195377 A1 * | 8/2011 | Sun | A61C 3/02 | 433/165 |
| 2011/0211921 A1 | 9/2011 | Volokh | | |
| 2011/0262232 A1 * | 10/2011 | Chen | B23B 29/046 | 407/46 |
| 2012/0009027 A1 | 1/2012 | Sharivker et al. | | |
| 2012/0039676 A1 * | 2/2012 | Marshansky | B23C 5/1054 | 407/48 |
| 2012/0093592 A1 * | 4/2012 | Durst | B23B 51/00 | 407/11 |
| 2012/0208147 A1 * | 8/2012 | Krumsiek | A61C 3/02 | 433/144 |
| 2013/0272807 A1 * | 10/2013 | Luik | B23C 5/109 | 407/11 |
| 2015/0306686 A1 * | 10/2015 | Mani | B23B 51/02 | 407/40 |
| 2016/0332241 A1 * | 11/2016 | Liu | B23C 5/26 | |

FOREIGN PATENT DOCUMENTS

| | | |
|---|---|---|
| GB | 2481295 A | 12/2011 |
| JP | 03073210 | 3/1991 |
| WO | 2013156536 | 10/2013 |

* cited by examiner

ROTATING TOOL AND TOOL HEAD

CLAIM TO PRIORITY

This application is a National entry application of German Application No. 102014207502.5, filed on Apr. 17, 2014, the entire contents of which is incorporated herein by reference.

FIELD OF THE INVENTION

The invention relates to a rotating tool comprising a support shaft extending in the axial direction along a rotational axis and having a tool head fastened to said support shaft and formed as a separate component, with the tool head being provided with grooves and having a number of cutting edges. The invention further relates to a tool head that is provided with grooves and has a number of cutting edges and is provided with a rotating tool for attaching to a support shaft.

BACKGROUND OF THE INVENTION

Such type of rotating tool and such type of tool head are disclosed, for example, in US 2011/0211921 A1 or US 2012/0009027 A1. These known rotating tools are modular milling tools in which the tool head can be fastened to a support shaft via a detachable screw coupling. US 2011/0211921 A1 discloses a separate coupling part made of tool steel. This coupling part can be connected, on one hand, to the tool head, which is made of a harder material than the coupling part, via a screw connection and, on the other hand, can be connected to another coupling part via an anchor. The other coupling part can be screwed into the support shaft.

Such type of rotating tool is intended for machining materials and is, for example, a milling, drilling, reaming, or counter-sinking tool. In order to improve the service life of such type of rotating tool, it can be produced from suitable and especially hard materials. Because such materials are typically expensive, however, oftentimes only the highly loaded parts of the rotating tool, such as, for example, its cutting edges, are made from the hard material or coated therewith or—particularly in the case of large tool diameters—modular rotating tools are used with replaceable tool heads.

For example, DE 3620115 A1 discloses a contour milling cutter consisting of a clamping shaft as well as a cutting shaft connected to this that also forms the cutting part. In this case, the cutting part is formed as a bushing made of polycrystalline diamond material and solidly applied to the cutting shaft formed as the receiving shaft.

In a similar manner, JP 3073210 A discloses a cutting tool having a radially reduced section on which a cylindrical body made of hard material is placed. Spiral grooves are placed in the cylindrical body to form the cutting edges.

Alternatively, US 2001/0024602 A1 discloses placing a number of grooves in a head of a cutting and reaming tool and filling it with hard material. U.S. Pat. No. 4,679,971 also discloses soldering a tool head produced completely from a hard material onto a tool body. Additionally known are modular tools, in particular drilling tools, in which a replaceable tool head is secured to a carrier shaft made of a tool steel. The tool head, designed for example as tool tip, is secured for example exclusively through clamping by having the tool head with a coupling part inserted in a clamping manner into a coupling receptacle of the carrier shaft. For this purpose, the carrier shaft frequently comprises two end face clamping webs between which the tool head is held clamped. Modular drilling tools of this type are disclosed in DE 10 2012 200 690 A1 or WO 03/070408 A1, for example.

SUMMARY OF THE INVENTION

The invention seeks to provide an improved rotating tool which will entail low costs, while having a long service life.

The problem is solved according to the invention by means of a rotating tool having the features of claim 1.

Advantageous embodiments, refinements and variants are the subject matter of the dependent claims.

To this end, the rotating tool has a support shaft extending in the axial direction along a rotational axis and a tool head connected to said support shaft at a connecting point. The tool head in this case is provided as an independent component which is fastened to the support shaft. The tool head likewise extends along the rotational axis and in turn comprises a base body with a core, which has a circular cross-section in a plane vertical relative to the rotational axis. Placed on the core is a jacket made of a cutting material, which has a specified wall thickness. A number of grooves are made in the jacket.

The rotating tool is, for example, a drilling, milling, reaming, or counter-sinking tool and is preferably a milling tool, particularly an end mill. During operation, the rotating tool generally rotates around the rotational axis in the direction of rotation. The rotating tool is intended for machining a material, for example a metal. To this end, the support shaft is clamped via a clamping shaft into a machine tool which transfers a rotational motion to the support shaft. In particular, the support shaft is designed such that it is rotationally symmetrical to the rotational axis and is essentially cylindrical.

The base body and thus the tool head are designed as a hybrid component comprised of multiple materials. One of these is the core, which is specifically used for attaching the jacket made of the cutting material. The core likewise extends along the rotational axis and over a certain length. The core is a rotational body of circular cross-section. The core is preferably formed in the shape of a cylinder or may also be formed, however, in the shape of a cone. The jacket is materially bonded to the core. In particular, the cutting material is soldered. The cutting material is applied to the core as a sheath with a specified wall thickness, typically in the millimeter range. Wall thickness is understood to mean the thickness of the cutting material in the radial direction, i.e. vertically in relation to the rotational axis. Furthermore, the jacket preferably extends in the axial direction over a specified length which expediently corresponds to the length of the core. In particular, the jacket has the same wall thickness over its entire length. The grooves and cutting edges are subsequently made in this jacket. Before the grooves and cutting edges are introduced, the jacket, just like the core, has a circular cross-sectional surface in its starting condition and is formed in the shape of a hollow cylinder, for example, or somewhat in the shape of a sleeve. Because the jacket forms the cutting edges for machining the material, the jacket is also subsequently referred to as the cutting jacket.

This design is based is on the idea using a prefabricated hybrid body with the jacket having a hollow cylindrical shape in the starting condition to serve as a blank that is economical to produce. The blank thus has a very simple shape in the starting condition that is simple to produce. Different diameters of the blank can thus be provided for different tool diameters. At the same time, the material required for the cutting material is limited by the hybrid design. This hybrid design with the core as the support structure also enables the use of very hard and very resistant materials which have a positive effect on the service life. Due to the additional fastening to the support shaft, the material consumption for the higher-value cutting materials and thus also the costs are additionally limited. Finally, a suitable pairing of materials of the connecting partners for the particular fastening is provided by the hybrid design and through targeted material selection at the various connection points, for example between the core and the jacket and at the fastening point between the tool head and the support shaft.

Preferably, the cutting material the sheath is made of optionally consists of polycrystalline diamond, so-called PCD, cubic crystalline boron nitride, so-called CBN, polycrystalline cubic boron nitride, so-called PCBN, or a comparable and particularly similarly hard material. These materials are characterized by having greater hardness than other materials and are thereby particularly well-suited for use as cutting material. A rotating tool having such type of material has a particularly long service life.

The core is expediently produced from carbide. This facilitates a reliable attachment of the jacket at the core, particularly through soldering.

The support shaft, on the other hand, is preferably produced from tool steel. This makes the support shaft particularly economical to produce. Through the use of different materials, it is possible to produce both tool parts, namely the support shaft and the base body, from the particular material that will satisfy the respective requirements for that tool part.

In a particularly expedient refinement, the tool head has a coupling piece connected at the core along the rotational axis, with the tool head being attached to the support shaft via the coupling piece. The coupling piece in this case is produced from a material different than that of the core, which is designed particularly for the fastening to the support shaft. This is preferably a material of greater elasticity than the core, so that the cutting forces that occur during machining can be reliably conducted into the support shaft via the fastening point.

For a reliable fastening of the coupling part to the core, these two parts are preferably materially bonded to one another, particularly through soldering.

To achieve economical operating costs, the rotating tool is designed entirely as a modular tool, and the tool head is detachably connected to the support shaft by means of the coupling part. In the event of a worn or damaged cutting jacket, only the tool head needs to be replaced. The term detachably in this case is understood to mean that the tool head is reversibly connectable to the support shaft.

A suitable coupling mechanism is described, for example, in documents US 2012 009027 A and US 2011 211921 A going back to the applicant.

Therefore, it is preferable if the support shaft and the tool head are connected to one another via the coupling part by means of a screw connection. For example, the coupling part has a shaft equipped with an outer thread, which can be screwed into a complementary inner thread when the tool head is being connected to the support shaft. The twisting direction of the screw connection is expediently the same as the rotational direction of the rotating tool, thereby ensuring in particular that the screw connection does not loosen during operation.

In a preferred embodiment, a particularly at least approximately cylindrical collar section of the coupling part connects to the core. In the attached state, said collar section is thus arranged between the core and the support shaft. The collar section preferably has the same or at least approximately the same diameter as the jacket. The collar section thus has a larger diameter than the core. In particular, a step is formed in the transition area such that the base body is formed in a T-shape by the core and the collar section when viewed from the side.

There are preferably opposing flat areas on the collar section having a defined width across flats for forming a tool-engaging means. Thus, the tool head can be rotated, in particular threaded, in and out of the support shaft using a wrench via these flat surfaces, in order to loosen or attach the tool head. As an alternative or in addition to this, a tool-engaging means is formed on a end face of the tool head.

In a preferred refinement, the grooves extend in an axial direction, i.e. in the direction of the rotational axis over the jacket and beyond. In other words: the grooves are made in the axial direction such that they are introduced via the cutting jacket and beyond, particularly also into the collar section of the base body. If necessary, they also continue into the support shaft as well.

Preferably, the grooves are ground into the jacket and also into the base body, if necessary. The wall thickness of the jacket is thus reduced by one groove depth in the area of the grooves. Groove depth here is understood to mean the radial distance of a groove base from the outer circumference of the jacket.

Preferably, the groove depth of at least one and particularly all of the grooves is greater than the wall thickness of the cutting jacket. In other words: the cutting jacket is separated during placement of the grooves such that a number of areas made of cutting material are formed, which are spaced apart from one another by the grooves. The grooves thus penetrate particularly into the core. This advantageously allows cutting material to be possibly saved, as the required wall thickness is not specified by the required depth of the grooves. The grooves are formed, for example, such that they have a groove depth suitable for operating the rotating tool, for example for machining and/or coolant requirements. Instead of a wall thickness corresponding to at least the groove depth, the cutting jacket is then made thinner, thereby accordingly reducing the requirements placed on cutting material during the manufacturing of the rotating tool.

In a suitable embodiment, the wall thickness of the jacket ranges from 0.2 mm to 5 mm. The wall thickness is expediently selected depending on the diameter of the rotating tool and/or its application area. It ranges, for example, from 0.1 to 0.3 times the diameter of the jacket.

The grooves extend in the axial direction, preferably in the shape of a helix or spiral, with a specified twist angle. The twist angle is the angle formed by the rotational axis and the respective groove. Preferably, the twist angle for the respective groove is the same at each longitudinal position, i.e., the twist angle is constant in the axial direction. The twist angle is preferably between −45° and 45°. Alternatively, the twist angle of the groove is different at various longitudinal positions, i.e., the respective groove is made, for example, with a twist angle increasing in the axial direction, i.e. the groove follows a curve. In this manner, the machining properties of the rotating tool can be made especially flexible.

In addition, each groove has a twist direction such that the groove extends in the shape of a helix in the twist direction, wherein the twist direction is aligned either with or against the rotational direction of the rotating tool. A twist direction is characterized as a positive twist direction if it corresponds to the direction of the groove on the end face with respect to the rotational direction; the corresponding twist direction is then positive. A twist direction is characterized as a negative twist direction, on the other hand, if it opposes the direction of the groove on the end face with respect to the rotational direction; the corresponding twist direction is then negative.

In a suitable refinement, there are at least two groove types with different twist angles, whereby the rotating tool can be designed as especially variable. In another suitable refinement, the twist direction of one groove type is positive and that of the other groove type is negative. In other words, the two groove types have different twist directions. This makes it especially possible to produce a rotating tool without a preferred direction, the rotational direction of which can thus be reversed without changing the cutting effect.

By designing two groove types with different twist directions, it is particularly possible as well to form two grooves such that they advantageously cross each other as they extend, i.e. they have intersections.

All grooves expediently have the same length. Alternatively, various grooves are implemented in different lengths, however. In particular, it is possible to advantageously influence the machining properties of the rotating tool by suitably selecting the length of each of the grooves.

The grooves in this case preferably have differing twist angles. As an alternative or in addition to this, an uneven tooth pitch is formed, i.e. the cutting edges are distributed unevenly around the circumference.

It is preferable if cutting edges and grooves are made in a end face of the tool head so that a material can also be machined by means of the end face. The rotating tool is thus especially suitable for machining a material on its end face, i.e. in the axial direction. If the rotating tool is a drill or even a face cutter, the material to be engaged can advantageously be machined by the cutting material in the feed direction as well, i.e. in the axial direction.

With this embodiment, the blank, i.e. the tool head prior to the introduction of cutting edges and grooves, is designed such that the jacket is formed as a hollow cylinder closed on the end face a front base, the hollow cylinder surrounding the core. Grooves are preferably placed both in the front base and in the cylindrical jacket surface.

In an expedient refinement, the cutting material is also in the front end face of the tool head. The front cutting edges with the additional grooves are preferably placed in the cutting material. In particular, additional cutting edges with allocated grooves are formed on this end face. In this connection, it is also possible for the grooves to have a depth that is greater than the thickness of the cutting material placed on the end face.

BRIEF DESCRIPTION OF THE DRAWINGS

Below, exemplary embodiments of the invention are explained in greater detail on the basis of the figures. which show.

Parts that function in the same manner have the same reference numbers in the figures.

DETAILED DESCRIPTION OF THE INVENTION

Figure 1:
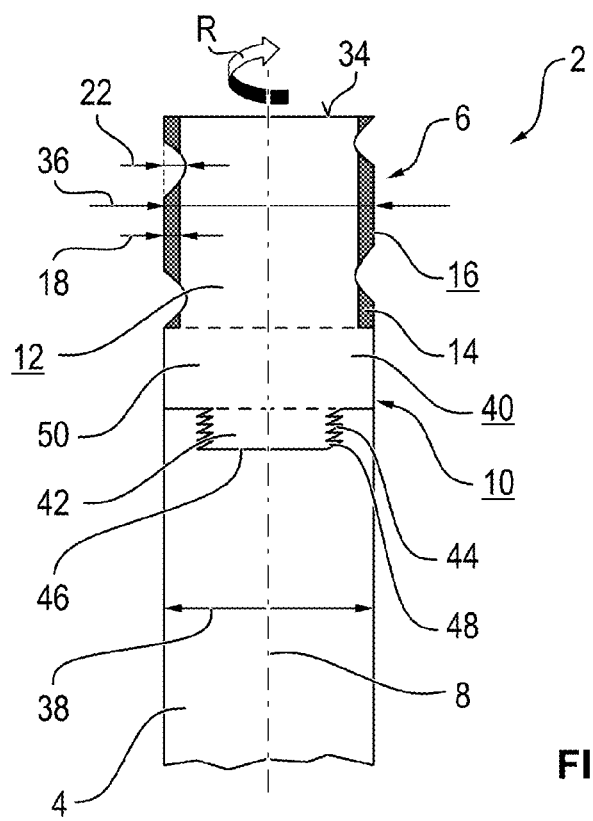
FIG. 1 schematically shows a cross-section of a rotating tool.
Figure 2:
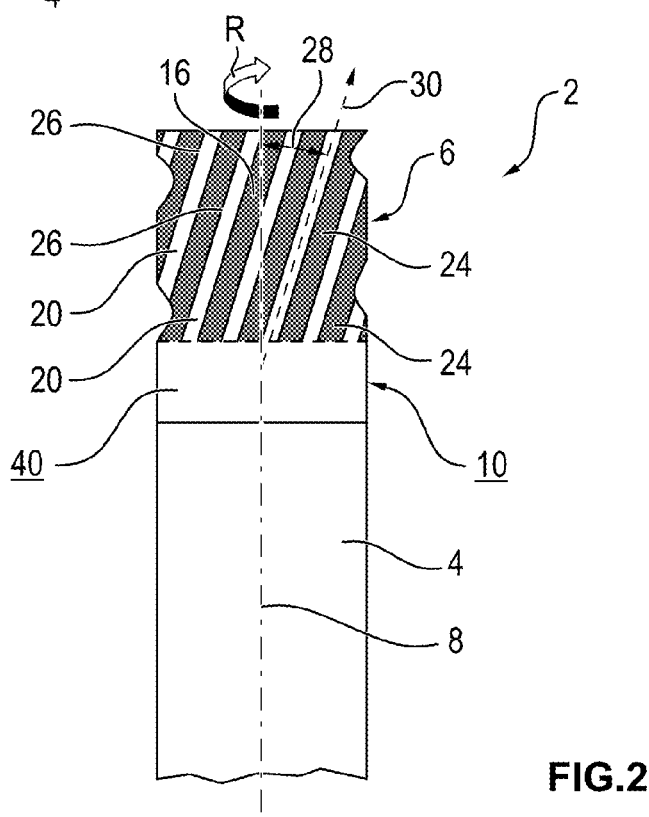
FIG. 2 shows the rotating tool according to FIG. 1 in a side view.

FIGS. 1 and 2 schematically show a rotating tool 2 having a support shaft 4 and a tool head 6. FIG. 1 shows the rotating tool 2 in a cross-section along the rotational axis 8, and FIG. 2 shows a side view. The support shaft 4 and the tool head 6 extend along a longitudinal axis, which corresponds to the rotational axis 8. In doing so, the rotational tool 2 rotates around the rotational axis 8 in the rotational direction R during operation. The tool head 6 has a base body 10, which comprises a core 12.

In the exemplary embodiment shown here, the core 12 is a cylinder, onto the jacket surface 14 thereof a jacket 16 made of cutting material is placed, which is subsequently also referred to as a cutting jacket 16. The cutting material in this case has a specified wall thickness 18.

The cutting jacket 16 has a number of grooves 20, which extend helically or spirally around the tool head 6. In particular, the grooves 20 are helically routed around the rotational axis 8. In the exemplary embodiment shown here, the grooves 20 are ground such that they are deeper than the thickness of the cutting jacket 16. In other words, the grooves 20 each have a groove depth 22 that is greater than the wall thickness 18. The cutting jacket 16 is thereby particularly separated, and the grooves 20 are continued radially in the base body 10 of the tool head 6. As a result of the separation of the cutting jacket 16, cutting surfaces 24 are formed that are particularly separated from one another. Furthermore, the grooves 20 also particularly result in cutting edges 26 which are suitable for machining a workpiece during rotation of the rotating tool 2.

To achieve the helical design of the grooves 20, each is made with a specified twist angle 28, i.e. the grooves 20 each extend at an angle to the rotational axis 8. In doing so, each of the grooves 20 extend in a groove direction 30, which forms the twist angle 28 with the rotational axis 8. In the exemplary embodiment shown here, the twist angle 28 of each of the grooves 20 is constant, meaning that the twist angle 28 of each groove 20 is the same at each longitudinal position along the rotational axis 8. In particular, all of the grooves 20 in the exemplary embodiment shown in FIGS. 1 and 2 have the same twist angle 28.

The tool head 6 and the support shaft 4 both have a diameter 36, 38 that is the same as that shown in FIGS. 1 and 2, whereby the support shaft 4 and the tool head 6 align in the axial direction. In this case, the diameter 36 of the tool head 6 is particularly the maximum diameter thereof.

Furthermore, the tool head 6 has a coupling part 40 which connects to the core 12 in the axial direction and is materially bonded thereto, particularly through soldering. The coupling part 40 is made of a tool steel, in contrast to the core 12, which is made of carbide.

The coupling part 40 enables a detachable threaded fastening of the tool head 6 to the support shaft 4. To this end, the coupling part 40 comprises a shaft 42 having an outer thread 44 in the exemplary embodiment shown here. The tool head 6 is connected to the support shaft 4 by means of the coupling part 40, by means of a screw connection in this example. For this purpose, the support shaft 4 has a recess 46 with an inner thread 48 correspondingly complementing the outer thread 44 of the tool head 6. A screw connection is particularly designed such that the rotational direction for connecting is the same as the rotational direction 8 of the rotating tool 2.

Furthermore, the coupling part 40 has a collar section 50 connecting directly to the core 12, which is designed as a cylindrical part between the jacket 16 and the support shaft 4. There are preferably grooves and/or flat areas for forming a tool-engaging means for a tool wrench—not shown in further detail here—in the collar section 50. The collar section 50 has a diameter that is at least similar or preferably the same as that of the support shaft 4 and/or the jacket 16.

Figure 3:
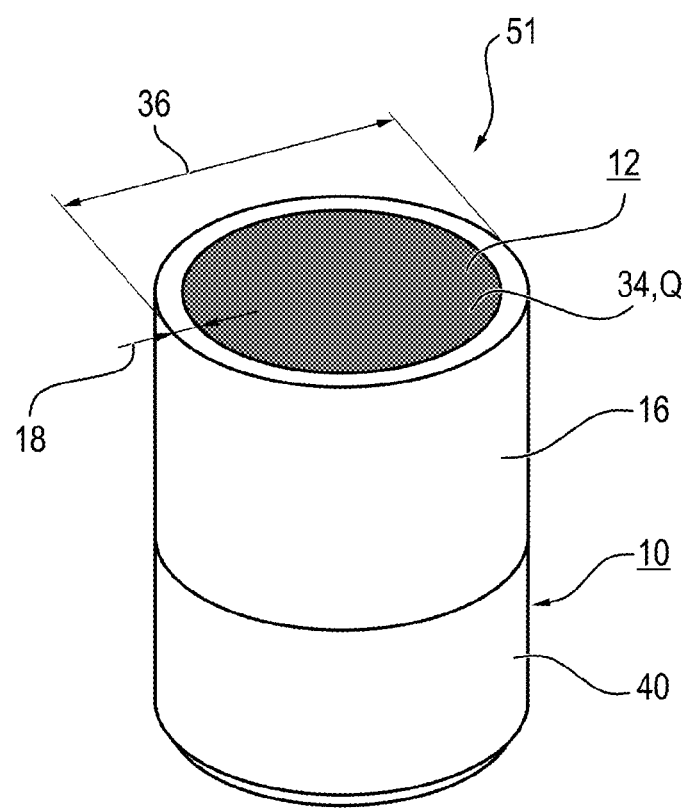
FIG. 3 shows a blank in order to form a tool head.
Figure 4:
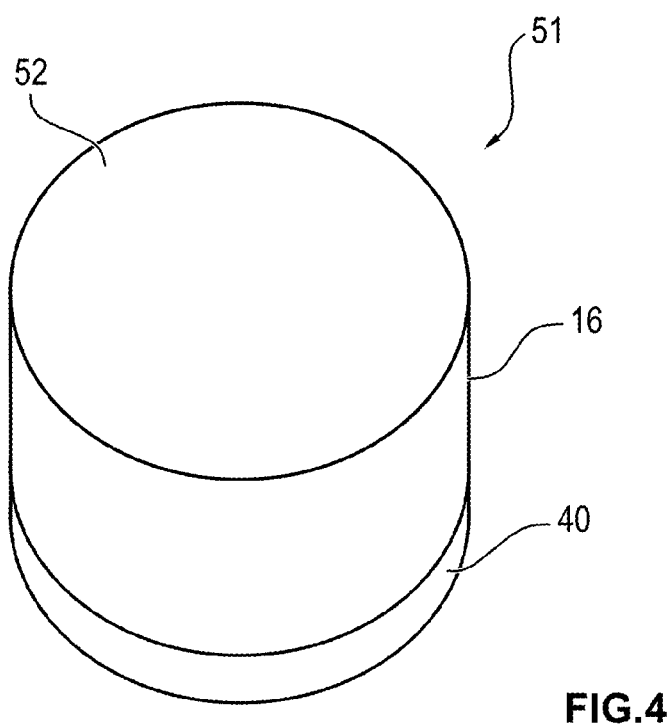
FIG. 4 shows an alternative blank in order to form a tool head.

The tool head 6 is produced from a blank 51, as is shown by way of example in two versions in FIGS. 3 and 4. FIG. 3 shows the setup with the coupling part 40 made of tool steel, the cylindrical core 12 made of hard metal, and the hollow-cylindrical sheath 16 made of cutting material. The jacket 16 is open on the end face 34, such that the core 12 forms part of the end face 34 on the front end.

Contrary to this, the sheath 16 in the version according to FIG. 4 has a front base 52 on the front.

In both cases, the cutting edges 26 and the grooves 20 are placed particularly through grinding to form the tool head 6 in the sheath 16. In addition, the coupling element for the detachable coupling with the support shaft 4 is introduced on the coupling part 40. In the exemplary embodiment, as the shaft 41 with the outer thread 44. Essentially however, other coupling types can be realized.

The core 12 is designed as a radially tapered section of the base body 10 and has a circular cross-section Q. The coupling part 40 has a larger diameter than the core 12. The diameter of the core 12, coupling part 40, and the wall thickness 18 are selected such that the sheath 16 and the coupling part 40 almost align in the axial direction in the exemplary embodiment shown here. In general, the coupling part 40 is somewhat set back in the radial direction with respect to the sheath 16.

The same blank 51 can thus advantageously be used as the starting point for a number of further embodiments with respect to the arrangement and design of the grooves 20.

Figure 5:
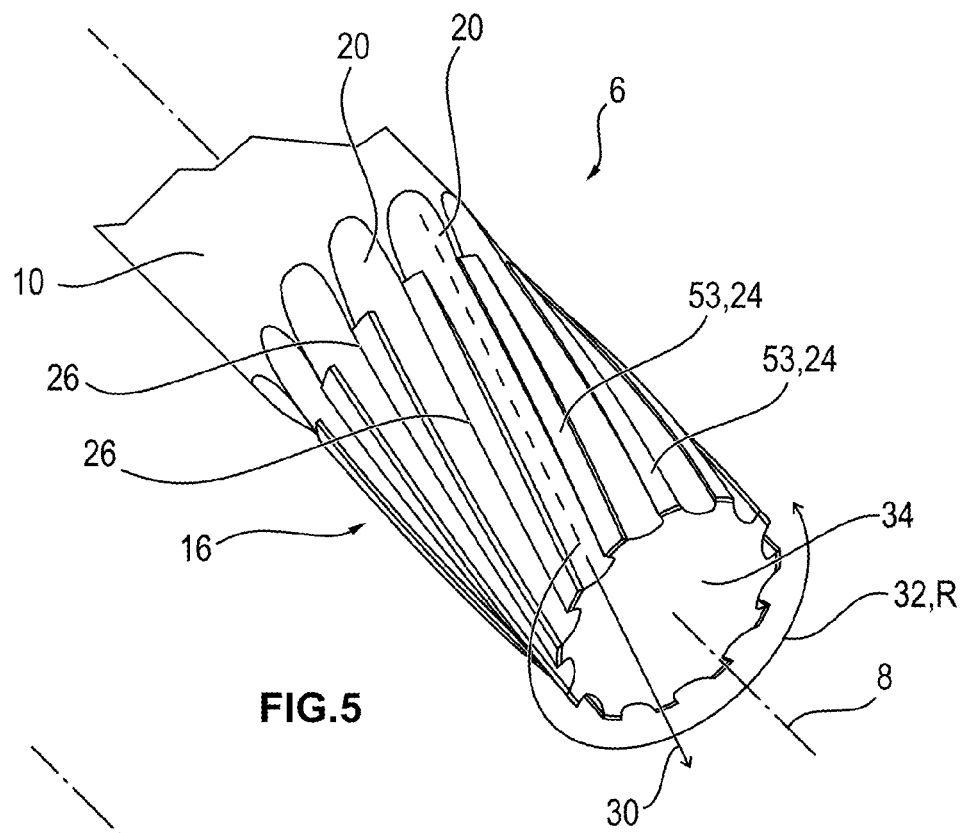
FIGS. 5-7 show perspective cutouts of differently formed rotating tools.
Figure 6:
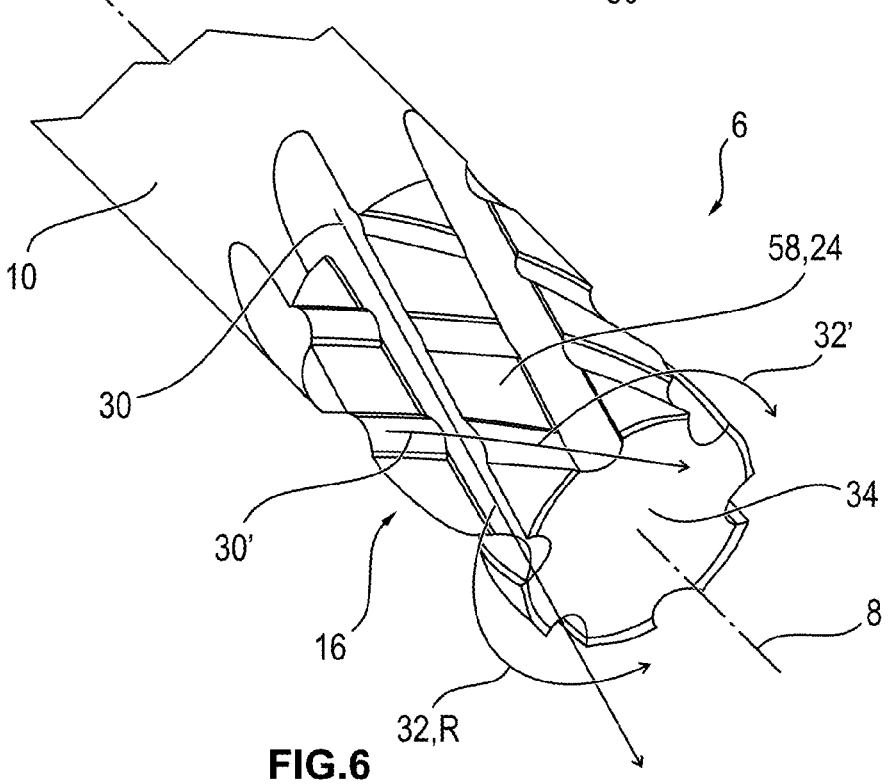
Figure 7:
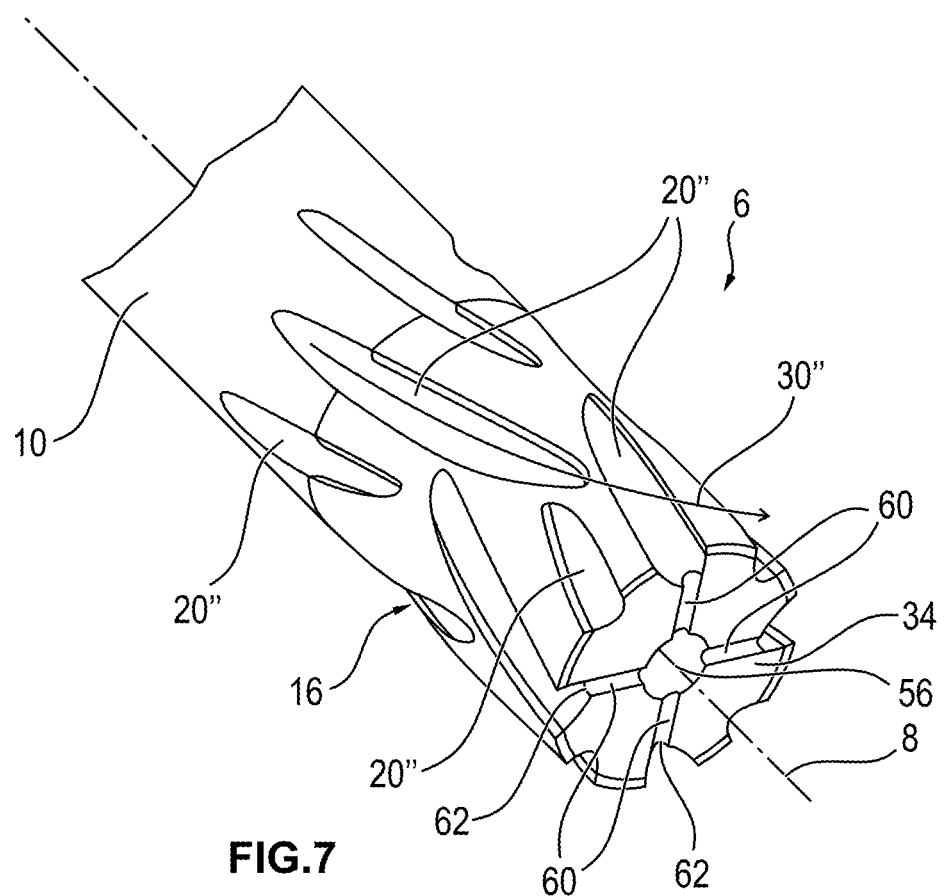

FIGS. 5 to 7 each show a version of tool heads 6 formed as face cutters, starting from the blank 51 according to FIG. 3, into which grooves 20, 20', 20" have been placed. It can clearly be seen in all three figures that grooves 20, 20', 20" have been placed deep enough such that the cutting jacket 16 is separated, and grooves 20, 20', 20" penetrate into the base body 10 of the tool head 6. Grooves 20, 20', 20" all extend in the shape of a helix and in a twist direction 32, 32' which is aligned either with or against the rotational direction 8. The helix is thus characterized by a particular twist angle 28 which is positive or negative.

The grooves 20 in FIG. 5 are all implemented in the same manner, which particularly means with the same helix or twist direction 32 and the same twist angle 28. In addition, all grooves 20 extend from the end face 34 of the tool head in the axial direction over the cutting jacket 16 and into the base body 12. Furthermore, the grooves 20 are uniform in the peripheral direction, which means they are arranged equidistant to the respective adjacent groove 20.

There is a bar 53 made of cutting material between every two grooves 20, with the bar having an edge in the exemplary embodiment shown here, which particularly serves as a cutting edge during operation of the rotating tool 2 in the rotational direction. The grooves 20 themselves then are particularly used as chip grooves to facilitate the conveying of chips produced when machining a workpiece.

FIG. 6 shows an alternative tool head 6 with two groove types 20, 20', in which the grooves 20 of a first groove type are designed similarly to the grooves 20 shown in FIG. 5. Compared to FIG. 5, only the distance between two grooves 20 adjacent in the peripheral direction has been enlarged. The first groove type is characterized here particularly by a positive twist direction 28, i.e., the twist direction 32 corresponds to the rotational direction. In contrast the twist angle 28 of the grooves 20' of the second groove type is negative; consequently, the twist direction 32' of these grooves 20' runs against the twist direction 32 of the grooves 20 of the first groove type. This results, in particular, in intersections 56 of grooves 20, 20' of differing type and islands 58 of cutting material, some of which are diamond-shaped due to the groove progression selected here.

FIG. 7 shows another alternative tool head 6 with grooves 20", having a twist angle 28 that changes along the groove 20", which means it is not constant along the groove 20". This advantageously gives the groove 20" a curved or bent shape. The grooves 20" are implemented such that they extend, in the axial direction, from approximately the center of the cutting jacket 16 to either the end face 34 of the tool head 6 or into the collar section 50 of the base body 10, in the exemplary embodiment shown here. The grooves 20" are particularly implemented with varying lengths.

In addition, multiple grooves 60 are placed into the front face 34 of the tool head 6 in the tool head 6 shown in FIG. 7. These grooves 60 form, in particular, an intersection there. The ends 62 thereof are each connected to a groove 20" in the cutting sheath 16, whereby chips can either be carried out of the front area or a coolant can be added via the side grooves 20", i.e. the grooves 20" of the cutting sheath 16, into the front area.

The three exemplary embodiments shown in FIGS. 5 to 7 have no cutting material in the front area, meaning in the area of the front face 34 of the tool head 5. In an alternative design however, additional cutting material is arranged here. For example, the tool head 6 shown in FIG. 4 has grooves 20 and cutting edges 26 according to one of the embodiments in FIGS. 5 to 7, and grooves 20 and cutting edges 26 are also formed on the front.

What is claimed is:

1. A rotating tool comprising:
   a support shaft extending in the axial direction along a rotational axis; and
   a tool head fastened to said support shaft and formed as a separate component, with the tool head having an end face opposite the support shaft and being equipped with grooves and having a number of cutting edges,
   wherein the tool head has a base body extending along the rotational axis, the base body having a core with a circular cross-sectional area, onto which a jacket made of cutting material is placed, into which the grooves and the cutting edges are made; and
   wherein the jacket is open on the end face such that the core forms part of the end face of the tool head; and
   wherein the grooves each have a specified groove depth in a radial direction and the groove depth of at least one of the grooves is greater than the wall thickness of the jacket.

2. The rotating tool according to claim 1, wherein the cutting material is polycrystalline diamond, cubic crystalline boron nitride, or polycrystalline cubic boron nitride.

3. The rotating tool according to claim 1, wherein the core is produced from carbide.

4. The rotating tool according to claim 1, wherein the support shaft is produced from tool steel.

5. The rotating tool according to claim 1, wherein the base body has a coupling part connecting to the core along the rotational axis, by means of which the tool head is attached to the support shaft.

6. The rotating tool according to claim 5, wherein the coupling part is made from a material of greater elasticity than the core.

7. The rotating tool according to claim 5, wherein the coupling part is materially bonded to the core.

8. The rotating tool according to claim 5, wherein the rotating tool is designed as a modular tool and the tool head is detachably connected to the support shaft by means of the coupling part.

9. The rotating tool according to claim 8, wherein the support shaft and the tool head are connected to one another by means of a screw connection.

10. The rotating tool according to claim 5, wherein the coupling part has a collar section extending along the rotational axis, and the collar section connects to the core and is arranged between the core and the support shaft.

11. The rotating tool according to claim 1, wherein the grooves extend in the axial direction over the jacket and beyond.

12. The rotating tool according to claim 1, wherein a wall thickness of the jacket ranges from 0.2 mm to 5 mm.

13. The rotating tool according to claim 1, wherein the cutting material is additionally present on a front end face of the tool head.

14. A tool head comprising:
- a base body having a core with a circular cross-sectional area, onto which a jacket made of cutting material is placed, the base body having an end face and a support end opposite the end face;
- a plurality of grooves formed in the base body, at least one of the plurality of grooves being formed partially in the jacket and partially in the core; and
- a number of cutting edges formed in the jacket,
- wherein the tool head is adapted to be connected to a support shaft at the support end; and
- wherein the jacket is open on the end face such that the core forms part of the end face of the tool head.

15. The tool head according to claim 14 further comprising a coupling part connecting to the core along the rotational axis at the support end,
- wherein the coupling part is made of a material of greater elasticity than the core; and
- wherein the coupling part can be detachably connected to the support shaft via the coupling part.

* * * * *